(12) United States Patent
Durocher et al.

(10) Patent No.: US 8,371,127 B2
(45) Date of Patent: Feb. 12, 2013

(54) COOLING AIR SYSTEM FOR MID TURBINE FRAME

(75) Inventors: Eric Durocher, Vercheres (CA); Pierre-Yves Legare, Chambly (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 707 days.

(21) Appl. No.: 12/572,066

(22) Filed: Oct. 1, 2009

(65) Prior Publication Data

US 2011/0079019 A1    Apr. 7, 2011

(51) Int. Cl.
*F02C 7/12* (2006.01)
(52) U.S. Cl. ............... 60/806; 60/796; 415/115
(58) Field of Classification Search ........... 60/796–798, 60/806; 415/115–117, 180
See application file for complete search history.

(56) References Cited

U.S. PATENT DOCUMENTS

| | | | |
|---|---|---|---|
| 3,945,758 A | 3/1976 | Lee | |
| 3,972,181 A * | 8/1976 | Swayne | 415/115 |
| 4,292,008 A | 9/1981 | Grosjean et al. | |
| 4,321,007 A | 3/1982 | Dennison et al. | |
| 4,435,958 A | 3/1984 | Klees | |
| 4,448,019 A | 5/1984 | Klees | |
| 4,462,204 A | 7/1984 | Hull | |
| 4,553,901 A * | 11/1985 | Laurello | 415/138 |
| 4,807,433 A | 2/1989 | Maclin et al. | |
| 4,820,116 A | 4/1989 | Hovan et al. | |
| 4,979,872 A | 12/1990 | Myers et al. | |
| 5,273,397 A | 12/1993 | Czachor et al. | |
| 5,292,227 A | 3/1994 | Czachor et al. | |
| 5,581,996 A | 12/1996 | Koch et al. | |
| 5,630,703 A | 5/1997 | Hendley et al. | |
| 5,806,303 A | 9/1998 | Johnson | |
| 5,809,772 A | 9/1998 | Giffin, III et al. | |
| 5,832,715 A | 11/1998 | Dev | |
| 5,867,980 A | 2/1999 | Bartos | |
| 5,996,331 A | 12/1999 | Palmer | |
| 6,035,627 A | 3/2000 | Liu | |
| 6,217,279 B1 * | 4/2001 | Ai et al. | 415/110 |
| 6,227,801 B1 | 5/2001 | Liu | |
| 6,351,938 B1 | 3/2002 | Kerrebrock | |
| 6,431,820 B1 | 8/2002 | Beacock et al. | |
| 6,558,114 B1 | 5/2003 | Tapley et al. | |
| 6,578,362 B1 | 6/2003 | Coffinberry | |
| 6,585,482 B1 | 7/2003 | Liotta et al. | |
| 6,672,072 B1 | 1/2004 | Giffin, III | |
| 6,763,652 B2 | 7/2004 | Baughman et al. | |
| 6,902,371 B2 | 6/2005 | Anderson, Jr. et al. | |
| 6,916,151 B2 | 7/2005 | Judet et al. | |
| 7,048,496 B2 | 5/2006 | Proctor et al. | |

(Continued)

FOREIGN PATENT DOCUMENTS

EP    1193371    4/2003

OTHER PUBLICATIONS

Tougaw, D. et al.; "Visualizing the Future of Virtual Reality"; Computing in Science & Engineering; vol. 5, No., pp. 8-11, Jul./Aug. 2003; Published by the IEEE CS and AIP.

*Primary Examiner* — Phutthiwat Wongwian
(74) *Attorney, Agent, or Firm* — Norton Rose Canada LLP

(57) ABSTRACT

A mid turbine frame is disposed between high and low pressure turbine assemblies. A cooling air system defined in the mid turbine frame of a gas turbine engine includes internal cavities for containing pressurized cooling air to cool the inter-turbine duct and the hollow struts, and discharges the used cooling air to further cool respective high and low pressure turbine assemblies.

20 Claims, 6 Drawing Sheets

U.S. PATENT DOCUMENTS

| | | |
|---|---|---|
| 7,210,899 B2 | 5/2007 | Wilson, Jr |
| 7,266,941 B2 | 9/2007 | Eleftheriou et al. |
| 7,334,392 B2 | 2/2008 | Moniz et al. |
| 7,383,686 B2 | 6/2008 | Aycock et al. |
| 8,099,962 B2 * | 1/2012 | Durocher et al. ............... 60/797 |
| 8,162,593 B2 * | 4/2012 | Guimbard et al. ............ 415/115 |
| 2006/0288686 A1 | 12/2006 | Cherry et al. |
| 2007/0025837 A1 | 2/2007 | Pezzetti, Jr. et al. |
| 2008/0112791 A1 | 5/2008 | Lee et al. |
| 2008/0112793 A1 | 5/2008 | Lee et al. |
| 2008/0112795 A1 | 5/2008 | Lee et al. |

* cited by examiner

COOLING AIR SYSTEM FOR MID TURBINE FRAME

TECHNICAL FIELD

The described subject matter relates generally to gas turbine engines and more particularly, to an improved cooling air system for a mid-turbine frame of a gas turbine engine.

BACKGROUND OF THE ART

A mid-turbine frame assembly is located between high and low pressure turbine rotor assemblies to support bearings and to transfer loads radially outwardly to a core casing. A mid-turbine frame supports an annular inter-turbine duct therein. The inter-turbine duct is defined between outer and inner duct walls which are interconnected by a plurality of radial hollow struts, thereby forming an annular hot gas path. The inter-turbine duct and the hollow struts are subjected to high temperatures and therefore cooling air is introduced around the inter-turbine duct and into the hollow struts to cool the same. In conventional cooling air systems for mid-turbine frames, cooling air is discharged into the hot gas path and cannot be recovered. This conventional cooling air system may not provide a sufficient pressure margin in the cooling air around the inter-turbine duct and inside of the hollow struts. Therefore, hot gas ingestion may occur.

Accordingly, there is a need to provide an improved cooling air system for a mid-turbine frame of a gas turbine engine.

SUMMARY

In accordance with one aspect, the described subject matter provides a gas turbine engine comprising a first turbine rotor assembly and a second turbine rotor assembly axially spaced apart from each other; a mid turbine frame (MTF) disposed axially between the first and second turbine rotor assemblies, including an annular outer case, annular inner case and annular bearing housing with bearing seals, the bearing housing being connected to the inner case, a plurality of load spokes radially extending between and interconnecting the outer and inner cases to transfer loads from the bearing housing to the outer case; an annular inter-turbine duct (ITD) disposed radially between the outer and inner cases of the MTF, the ITD including an annular outer duct wall and annular inner duct wall, thereby defining an annular hot gas path between the outer and inner duct walls for directing hot gases from the first turbine rotor assembly to the second turbine rotor assembly, a plurality of hollow struts radially extending between and interconnecting the outer and inner duct walls, the load transfer spokes radially extending through at least a number of the hollow struts; and wherein the MTF defines a cooling air system, the system being formed with a first cavity between the outer case and the outer duct walls of the ITD with a first inlet defined in the outer case, a second cavity between the inner duct wall and the inner case, the first cavity, second cavity and the respective hollow struts being in fluid communication with the first inlet for receiving pressurized cooling air, the cooling air system including a cooling air discharge device at respective upstream and downstream sides of the MTF for discharging cooling air from the system to further cool the respective first and second rotor assemblies, and a flow restrictor configured for metering a cooling air flow escaping from the second cavity in order to provide a pressure margin the cavities in the MTF and the hot gas path to impede hot gas ingestion into the cavities of the MTF.

In accordance with another aspect, the described subject matter provides a gas turbine engine comprising a first turbine rotor assembly and a second turbine rotor assembly axially spaced apart from each other; and a cooling air system including a first inlet defined in the mid turbine frame (MTF) and a second inlet defined in a rotating shaft of the engine for receiving pressurized cooling air from separate passages, the cooling air system having a first cavity between an outer case and an outer duct wall of an inter-turbine duct (ITD) disposed inside the outer case, a second cavity between an inner duct wall of the ITD and an inner case, a third cavity between the inner case and a bearing housing mounted to the inner case, a cooling air passage in the bearing housing, and a chamber defined by an arch structure integrated with the inner case and communicating with the first inlet through a first flow path, the first flow path extending from the first cavity through a hollow passage in the ITD to the second cavity, the chamber communicating with the second inlet through a second flow path, the second flow path extending through the cooling air passage in the bearing housing, the chamber also communicating with the third cavity, and at least one of the cavities including a cooling air discharge device located at respective upstream and downstream sides of the MTF for discharging cooling air from the system to the respective first and second rotor assemblies.

Further details of these and other aspects of the described subject matter will be apparent from the detailed description and drawings included below.

DESCRIPTION OF THE DRAWINGS

Reference is now made to the accompanying drawings depicting aspects of the present description, in which.

DETAILED DESCRIPTION OF THE PREFERRED EMBODIMENTS

Figure 1:
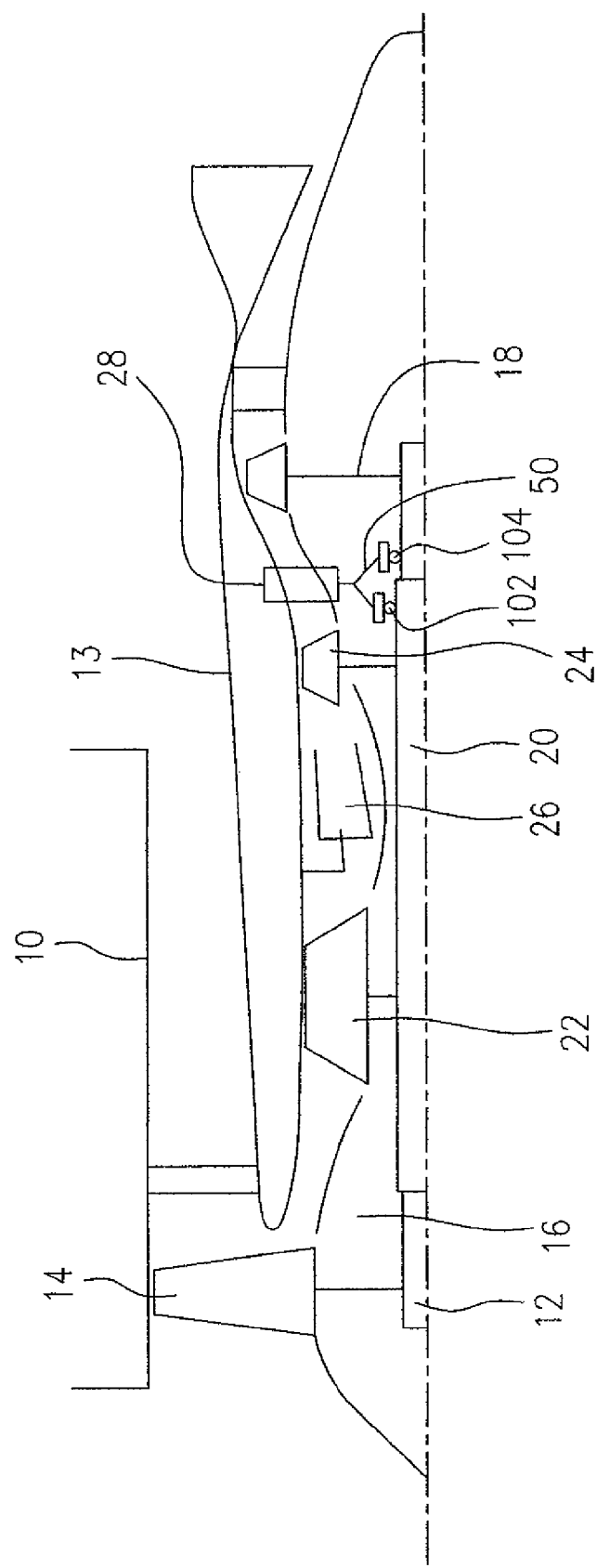
FIG. 1 is a schematic cross-sectional view of a turbofan gas turbine engine according to the present description.
Figure 2:
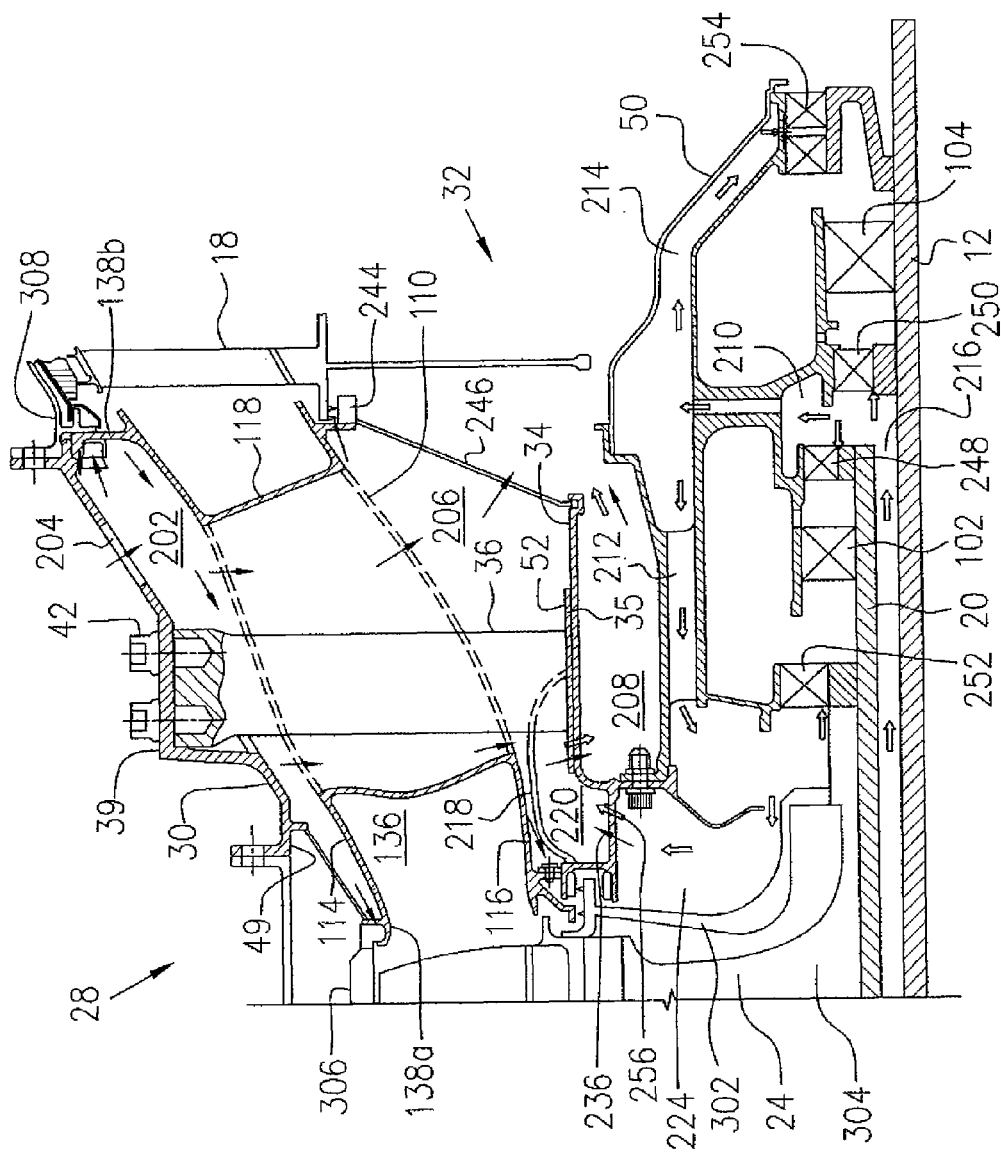
FIG. 2 is a partial cross-sectional view of the gas turbine engine of FIG. 1, showing a cooling air system for a mid-turbine frame thereof.
Figure 3:
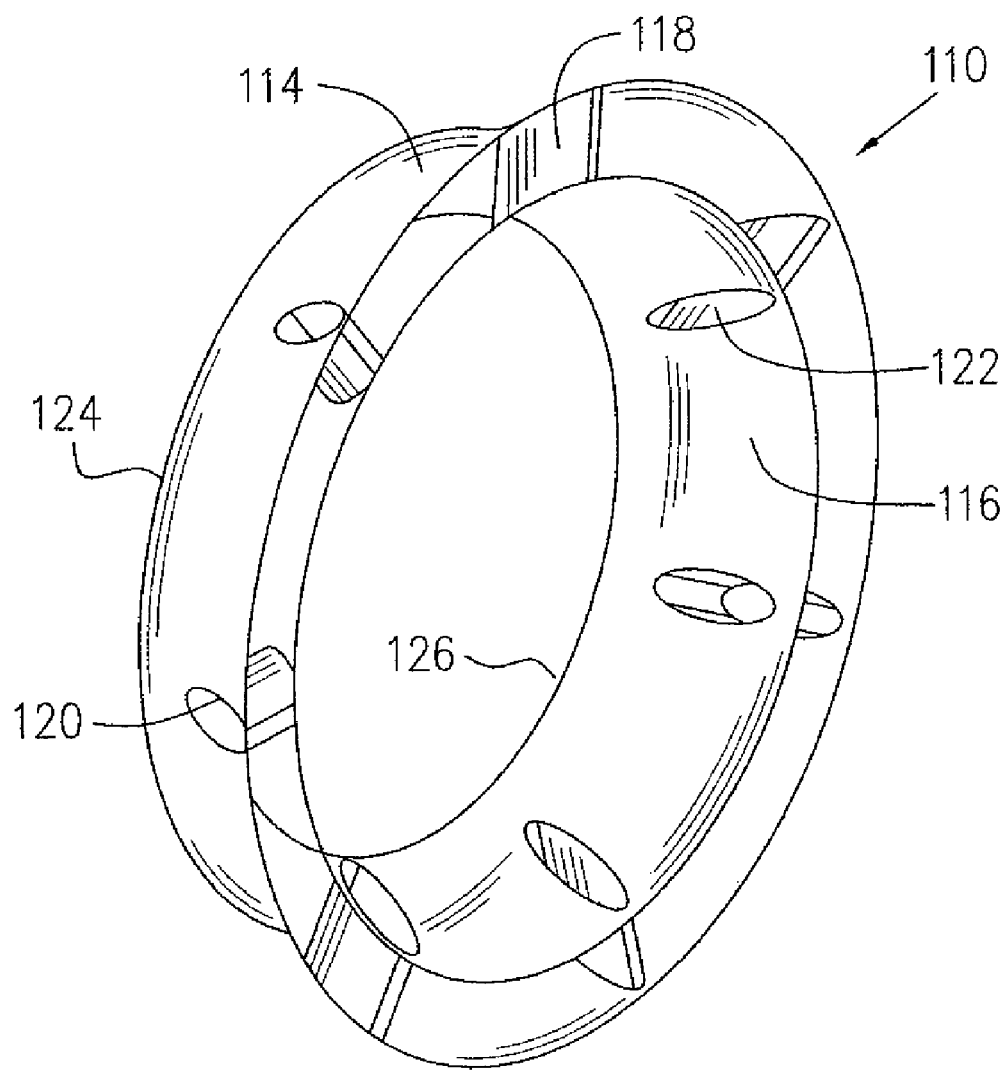
FIG. 3 is a perspective view of an inter-turbine duct included in the mid-turbine frame of FIG. 2.
Figure 4:
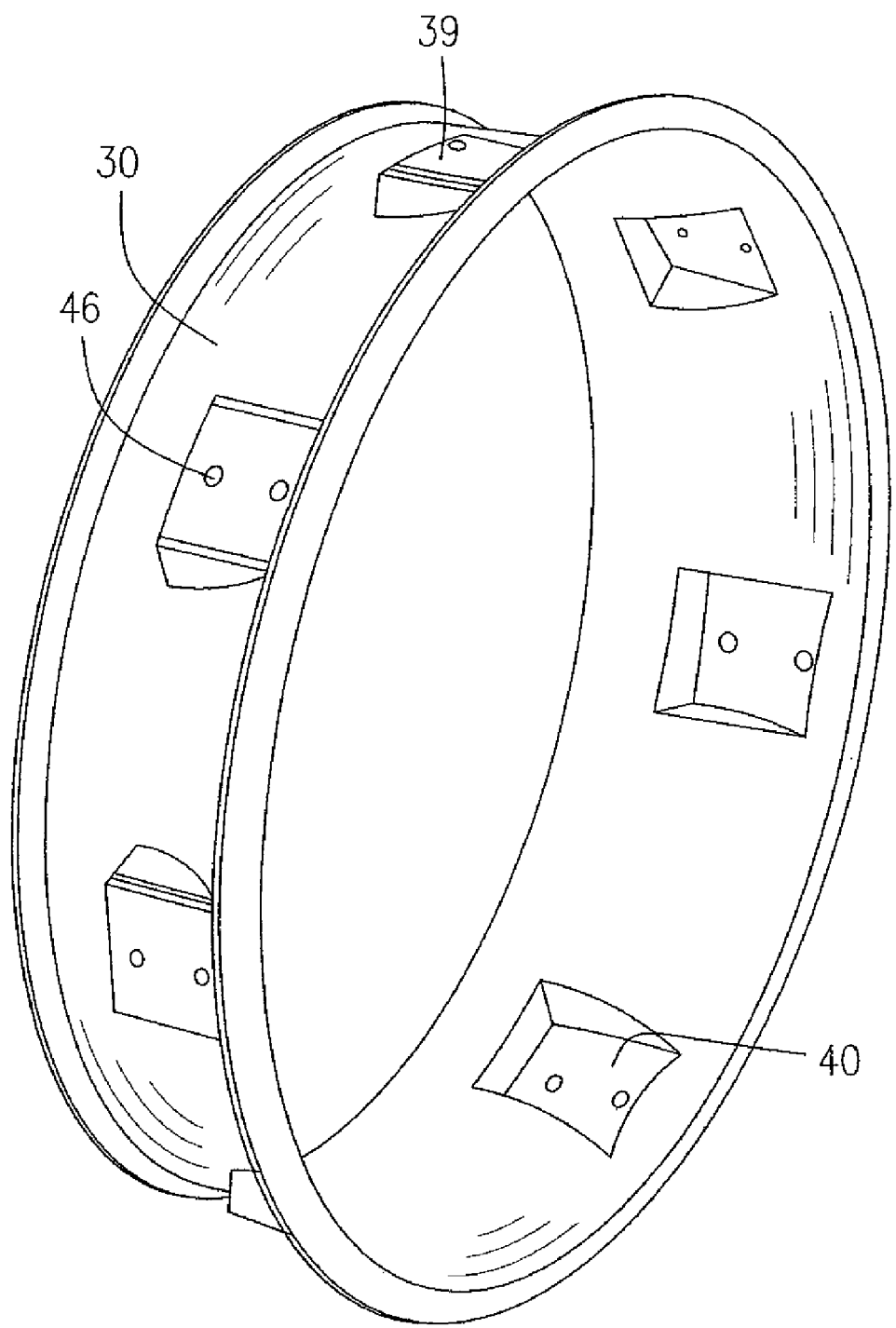
FIG. 4 is a perspective view of an outer case of the mid-turbine frame of FIG. 2.
Figure 5:
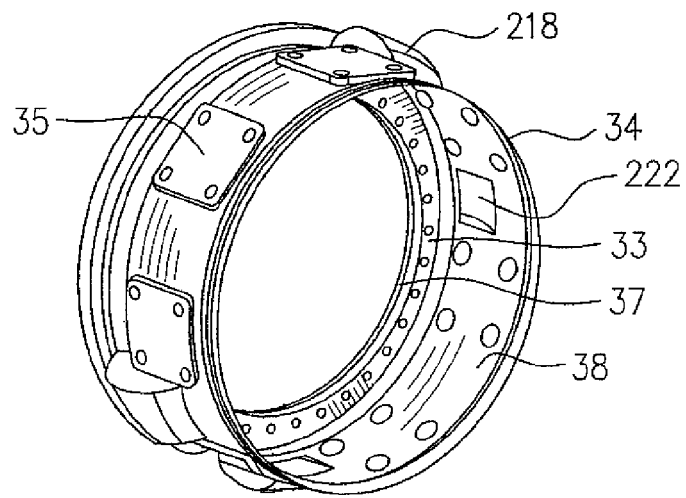
FIG. 5 is a perspective view of an inner case of the mid-turbine frame of FIG. 2.

Referring to FIG. 1, a turbofan gas turbine engine includes a fan case 10, a core case 13, a low pressure spool assembly which includes a fan assembly 14, a low pressure compressor assembly 16 and a low pressure turbine assembly 18 connected by a shaft 12, and a high pressure spool assembly which includes a high pressure compressor assembly 22 and a high pressure turbine assembly 24 connected by a turbine shaft 20. The core casing 13 surrounds the low and high pressure spool assemblies to define a main fluid path therethrough. In the main fluid path there is provided a combustor 26 to generate combustion gases to power the high pressure turbine assembly 24 and the low pressure turbine assembly 18. A mid turbine frame system 28 is disposed between the high pressure turbine assembly 24 and the low pressure turbine assembly 18 and supports a bearing housing 50 containing for example #4 and #5 bearings 102 and 104 around the respective shafts 20 and 12. The terms "axial" and "radial" used for various components below are defined with respect to the main engine axis shown but not numbered in FIG. 1.

Referring to FIGS. 1-5, the mid turbine frame (MTF) system 28 includes, for example, an annular outer case 30 which has mounting flanges (not numbered) at both ends with mounting holes therethrough (not shown), for connection to other components (not shown) which cooperate to provide the core casing 13 of the engine. The outer case 30 may thus be a part of the core casing 13. A spoke casing 32 includes an annular inner case 34 axially disposed within the outer case 30 and a plurality of load transfer spokes 36 (at least 3 spokes) radially extending between the outer case 30 and the inner case 34. The inner case 34 generally includes an annular axial wall 38 and an annular radial wall 33. The annular radial wall 33 is provided with an annular axial flange to define an inner diameter surface 37 which is concentric about an axis (not shown) of the inner case 34. The spoke casing 32 supports the bearing housing 50 (schematically shown in FIGS. 1 and 3), mounted thereto in a suitable fashion such as by fasteners (not numbered), which accommodates one or more main shafts bearing assemblies therein, such as #4 bearing 102, and #5 bearing 104. The bearing housing 50 is connected to the spoke casing 32 and is centered with the annular inner case 34 and rests on the inner diameter surface 37 of the inner case 34, thereby being centered with the annular inner case 34.

The MTF system 28 may be further provided with an inter-turbine duct (ITD) structure 110 for directing combustion gases to flow through the MTF system 28. The ITD structure 110 includes, for example an annular outer duct wall 114 and an annular inner duct wall 116. An annular path 136 is defined between the outer and inner duct walls 114, 116 to direct the combustion gas flow.

The ITD 110 further includes a plurality of radially-extending hollow struts 118 (at least three struts) connected to the respective outer and inner duct walls. A plurality of openings 120, 122 are defined in the respective outer and inner duct walls 114, 116 and are aligned with the respective hollow struts 118 to allow the respective load transfer spokes 36 to radially extend through the hollow struts 118.

The ITD structure 110 may include a retaining apparatus such as an expansion joints 138a and 138b (see FIG. 2) for supporting the ITD structure 110 within the outer case 30.

The load transfer spokes 36 are each connected at an inner end (not numbered) thereof, to the axial wall 38 of the inner case. For example, a flat end plate 52 which is substantially perpendicular to the spoke 36 and is connected to an axial surface of a connecting pad 35, which is substantially perpendicular to the spoke 36 connected thereto. The spokes 36 are each connected at an outer end (not numbered) thereof to the outer case 30 by a plurality of fasteners 42. The fasteners 42 extend radially through openings 46 (see FIG. 4) defined in the outer case 30, and into holes (not numbered) defined in the outer end of the spoke 36.

The outer case 30 includes for example, a plurality of support bases 39, each being defined as a flat base substantially normal to a central axis (not shown) of the respective load transfer spokes 36. The support bases 39 are formed by a plurality of respective recesses 40 defined in the outer case 30. The recesses 40 are circumferentially spaced apart one from another corresponding to the annular position of the respective load transfer spokes 36. The outer case 30 in this embodiment has a truncated conical configuration in which a diameter of a radial end of the outer case 30 is larger than a diameter of a front end of the outer case 30. Therefore, a depth of the support bases 39/recesses 40 varies, decreasing from the front end to the rear end of the outer case 30. An inner diameter surface 49 is circumferentially and axially defined in the front end of the outer case 30, which is concentric about the axis of the annular outer case 30. The inner case 34 is supported within the outer case by the plurality of the radial spokes 36. Due to the machining accuracy limit of the spokes and tolerance stack up during the assembly procedure of the MTF system 28, the inner case 34 and thus the attached bearing housing 50 may not be concentrically positioned within the outer case 30 to meet engine design requirements. Therefore, special measurements may be needed during the assembly procedure of the MTF system 28 in order to ensure the concentricity of the bearing housing 50 with respect to the outer case 30.

Referring to FIGS. 1-2 and 6-8, there is a cooling air system (not numbered) substantially defined with the structure of the MTF system 28 and illustrated by a plurality of arrows (not numbered) in the drawings which represent cooling air flow directions. The cooling air system includes a first cavity 202 defined between the outer case 30 and outer duct wall 114 with first inlet 204 defined in the outer case 30. A second cavity 206 is defined between the inner duct wall 116 and the inner case 34. The first and second cavities 204, 206 and the spaces (not numbered) defined within the respective hollow struts 118 are in fluid communication with a pressurized cooling air source of the engine, such as the compressor air from the high pressure compressor assembly 22, through the first inlet 204. A cooling air discharge device may be defined at the respective upstream and downstream sides of the MTF system 28, for example being incorporated with the joints 138a and 138b, for discharging cooling air from the cooling air system to further cool the respective high pressure and low pressure turbine assemblies 24, 18, which will be further described in detail hereinafter.

A third annular cavity 208 is defined between the inner case 34 and the bearing housing 50. A cooling air passage (not numbered) including a radial section 210 which is connected with a forward section 212 and a rearward section 214, is defined within the bearing housing 50. The cooling air passage in the bearing housing 50 is in fluid communication with a second inlet 216 defined in an engine rotating shaft which, for example, is defined on the rear end of turbine shaft 20 and is in fluid communication with, for example, the same pressure air source as the first inlet 204, through air passages (not numbered) within the turbine shaft 20.

The inner case 34 may be provided with a plurality of arch structures 218 circumferentially spaced one from another, defining respective chambers 220 in fluid communication through openings 222 in the annular axial wall 38 of the annular inner case 34 (see FIG. 5), with the third annular cavity 208. The respective chambers 220 are also in fluid communication with an annular cavity 224 defined between the upstream side of the MTF system 28 and an annular rear plate 302 mounted to a rear side of a rotor disk 304 of the high pressure turbine assembly 24. Therefore, the first and second inlets 204, 216, the first, second and third annular cavities 202, 206 and 208, the respective hollow struts 118 and the cooling air passages in the bearing housing 50 are in fluid communication one with another.

Figure 6:
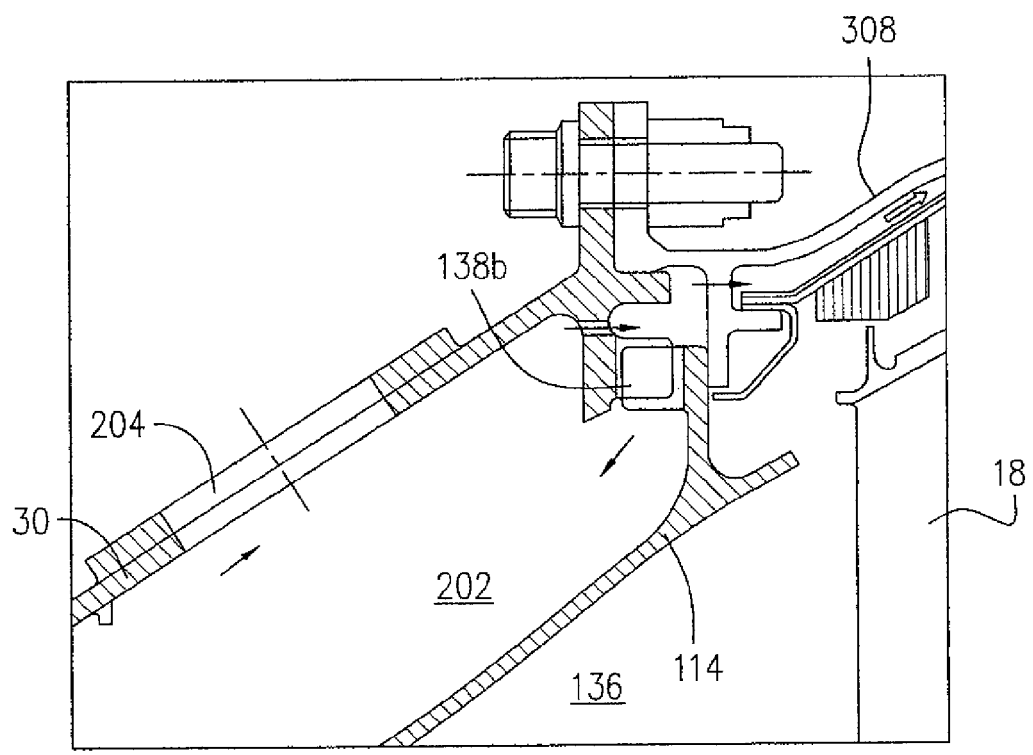
FIG. 6 is a partial cross-sectional view of the gas turbine engine of FIG. 1 in an enlarged scale, showing a cooling air discharging device incorporated with a rear axial end of the respective outer case and an outer duct wall of the mid-turbine frame.

A first inlet cooling air flow generally indicated by solid arrows (not numbered), is introduced from the first inlet 204 and enters the first cavity 202. The respective front and rear axial ends of the outer duct wall 114 are provided with joints 138a and 138b. The joint 138a is connected to a turbine shroud support structure 306 of the high pressure turbine assembly 24 and the joint 138b is connected to the outer case 30. The respective joints 138a and 138b may be optionally provided with a cooling air discharge device such as small gaps or holes (not shown) acting as a flow restrictor to allow a portion of the cooling air in the first cavity 202 to escape therefrom forwardly and rearwardly for supplying cooling air to the respective high pressure and low pressure turbine assemblies 24 and 18, particularly the shrouds thereof. For example, the joint 138b is illustrated in an enlarged scale in FIG. 6, showing a portion of the first inlet cooling air in a predetermined limit, passing through the joint 138b into a case 308 of the low pressure turbine assembly 18.

The cooling air in the first cavity 202 cools the outer duct wall 114 of the ITD 110 and passes through in the respective hollow struts 118 to cool the same. The cooling air which passes through the respective hollow struts 118, enters the second cavity 206 and cools the inner duct wall 116.

Figure 7:
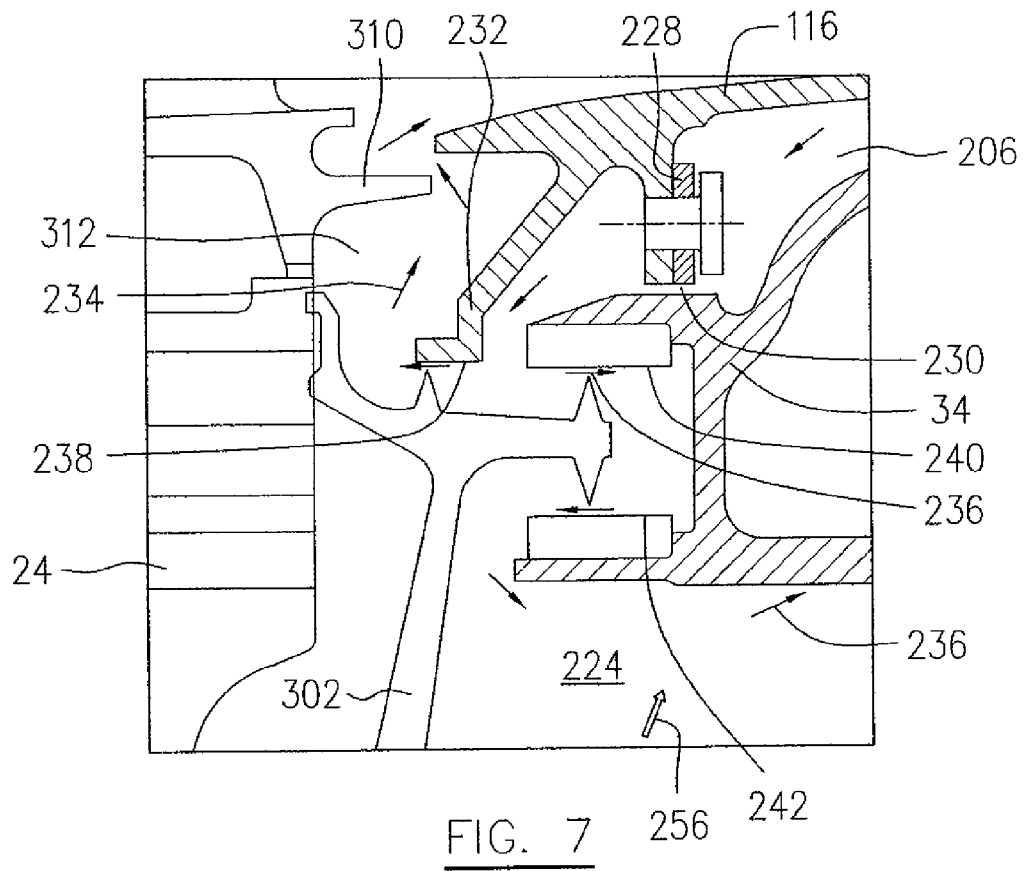
FIG. 7 is a partial cross-sectional view of the gas turbine engine of FIG. 1 in an enlarged scale, showing an air flow restrictor and sealing arrangement of the mid-turbine frame located at axial front ends of the respective inner case and inner duct wall.
Figure 8:
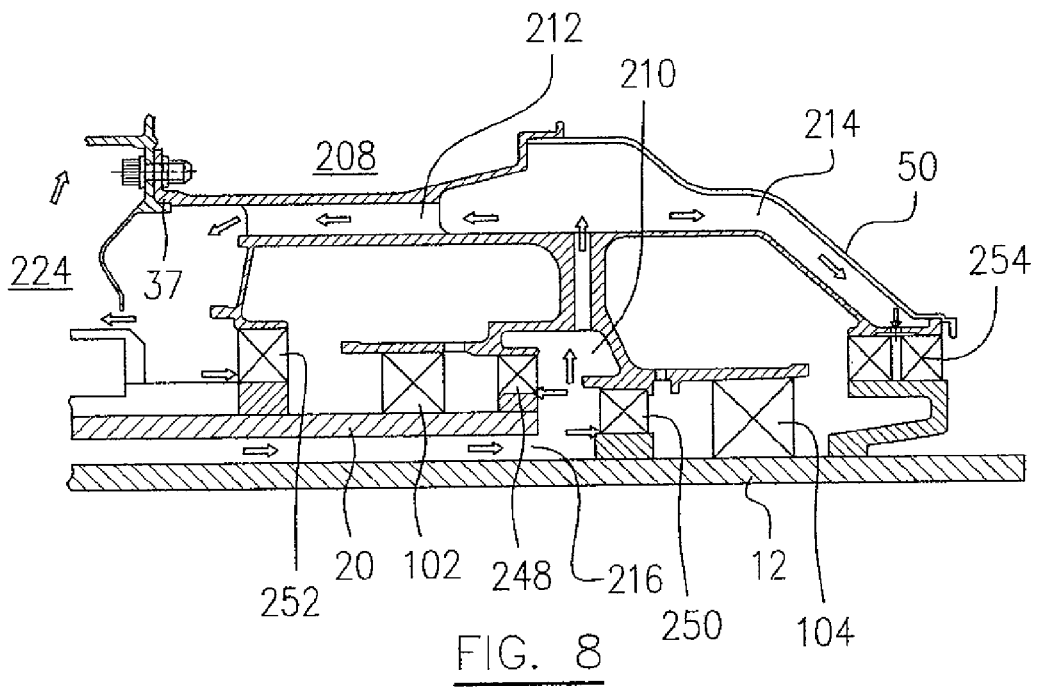
FIG. 8 is a partial cross-sectional view of the gas turbine engine of FIG. 1 in an enlarged scale showing an air passage extending within a bearing housing of the mid-turbine frame.

An air flow restrictor 228 including a seal ring (not numbered), is provided in the second cavity 206 near the upstream side of the MTF (see FIG. 7). The seal ring of the air flow restrictor 228 is supported on the inner duct wall 116 and surrounds an annular surface (not numbered) of the inner case 34 to define an annular gap 230 with predetermined size in order to allow a limited portion of the cooling air in the second cavity 206 to pass forwardly therethrough to escape from the second cavity 206.

A flow restricting/sealing arrangement generally indicated by numeral 232 is provided adjacent to the restrictor 228. This flow restricting/sealing arrangement 232 is configured for splitting the portion of the cooling air escaping through the annular gaps 232 of the flow restrictor 228, into a first air flow indicated by solid arrows 234 to be discharged from the cooling air system of the MTF 28 to cool the high pressure turbine assembly 24 and a second cooling air flow indicated by solid arrows 236 to be directed into the third cavity 208. In particular, the flow restricting/sealing arrangement 232 according to one embodiment, may be formed between the high pressure turbine assembly 24 and the MTF system 28, to allow the first air flow 234 discharged from the cooling air system 28 to pressurize a blade rim seal 310 and cool a blade back cavity 312 of the high pressure turbine assembly 24. For example, the flow restricting/sealing arrangement 232 may include axial surfaces 238, 240 and 242 defined in the respective inner duet wall 116 and the inner case 34, which are adjacent to a seal component (not numbered) defined on the annular rear plate 302 mounted to the rotor disc 304 of the high pressure turbine assembly 24.

A flow restricting and sealing arrangement generally indicated by numeral 244 may also be provided between the rear axial end of the inner duct wall 116 of the ITD structure 110 and a rotor disk 314, to allow a limited portion of the cooling air in the second cavity 206 to be discharged through the flow restricting and sealing arrangement 244, for supplying cooling air for the low pressure turbine assembly 18. An annular plate 246 is provided to cover the annular rear opening between the rear axial end of the inner duct wall 116 of the ITD structure 110 and the annular axial rear end of the inner case 34. Optionally, the annular plate 246 may be provided with some holes (not shown) for discharging a limited portion of the cooling air in the second cavity 206 for cooling the low pressure turbine assembly 18.

All the above-described discharge devices at the respective upstream and downstream sides of the MTF system 28 which are incorporated with a flow restricting function, are used to allow a predetermined amount of cooling air substantially introduced from the first inlet 204 to be discharged for further cooling the respective high and low pressure turbine assemblies 24, 18 while providing a pressure margin within the first and second cavities and in the spaces of the respective hollow struts 118 in order to avoid hot gas ingestion into the ITD structure 110 in cases of ITD cracking or material loss.

A second inlet cooling air flow which is generally indicated by the hollow arrows (not numbered) is introduced from the second inlet 216 and enters into the the radial section 210 of the cooling air passage in the bearing housing 50. The second inlet cooling air flow is directed by the radial section 210 to pass, for example between a rear seal 248 of the bearing 102 and a front seal 250 of the bearing 104, thereby pressurizing the respective seals 248 and 250. The cooling air flow radially outwardly having passed through the radial section 210 is split into a forward cooling air flow for pressurizing a front seal 252 of the bearing 102 and a rearward cooling air flow for pressurizing a rear seal 254 for the bearing 104.

The forward cooling air flow directed through the forward section 212 of the cooling air passage in the bearing housing 50 for pressurizing the seal 252 is further directed into the chamber 220 through the cavity 224 as indicated by hollow arrow indicated by 256. The second cooling air flow 236 escaping from the restricting/sealing arrangement 232 also enters the chamber 220 through the annular cavity 224. Therefore, a portion of the first inlet cooling air represented by the solid arrow 236 and a portion of the second inlet cooling air flow represented by the hollow arrow 254 are mixed in the chamber 220 and then the mixture thereof is directed into the third cavity 208. The mixed portion of the first and second inlet cooling air flows in the third cavity 208 is discharged through a rear opening (not numbered) of the third cavity 208 for supplying cooing air for the low pressure turbine assembly 18.

The above-described cooling air system provides sufficient and reliable cooling flow to ensure that turbine components meet expected life-span and also provides sufficient air pressure margins around the ITD structure and static vanes to avoid hot gas ingestion that could compromise turbine component life expectancies. The above-described cooling air system further provides sufficient cooling air pressure and an optimum cooling air network, to keep oil in bearing chambers of the bearing housing in order to avoid leakage and ignition of the oil.

The above description is meant to be exemplary only, and one skilled in the art will recognize that changes may be made to the embodiments described without departure from the scope of the described subject matter. For example, the MTF system and the bearing housing may be configured differently than those described above and illustrated in the accompanying drawings. Still other modifications which fall within the scope of the described subject matter will be apparent to those skilled in the art, in light of a review of this disclosure, and such modifications are intended to fall within the appended claims.

The invention claimed is:
1. A gas turbine engine comprising:
a first turbine rotor assembly and a second turbine rotor assembly axially spaced apart from each other;

a mid turbine frame (MTF) disposed axially between the first and second turbine rotor assemblies, including an annular outer case, annular inner case and annular bearing housing with bearing seals, the annular bearing housing being connected to the annular inner case, a plurality of load spokes radially extending between and interconnecting the annular outer and annular inner cases to transfer loads from the annular bearing housing to the annular outer case; an annular inter-turbine duct (ITD) disposed radially between the annular outer and annular inner cases of the MTF, the ITD including an annular outer duct wall and annular inner duct wall, thereby defining an annular hot gas path between the annular outer and annular inner duct walls for directing hot gases from the first turbine rotor assembly to the second turbine rotor assembly, a plurality of hollow struts radially extending between and interconnecting the annular outer and annular inner duct walls, the load transfer spokes radially extending through at least a number of the hollow struts; and wherein the MTF defines a cooling air system, the system being formed with a first cavity between the annular outer case and the annular outer duct walls of the ITD with a first inlet defined in the annular outer case, a second cavity between the annular inner duct wall and the annular inner case, the first cavity, second cavity and the respective hollow struts being in fluid communication with the first inlet for receiving pressurized cooling air, the cooling air system including a cooling air discharge device at respective upstream and downstream sides of the MTF for discharging cooling air from the system to further cool the respective first and second rotor assemblies, and a flow restrictor supported between the annular inner duct wall and the annular inner case to defines an annular gap and configured for metering a cooling air flow escaping from the second cavity in order to provide a pressure margin within the first and second cavities in the MTF and the hot gas path to impede hot gas ingestion into the first and second cavities of the MTF.

2. The gas turbine engine as defined in claim 1 wherein the cooling air system further comprises a third cavity between the annular inner case and the annular bearing housing, and a cooling air passage in the annular bearing housing, the third cavity and the cooling air passage in the annular bearing housing being in fluid communication with a second inlet defined in a rotating shaft of the gas turbine engine for receiving pressurized cooling air.

3. The gas turbine engine as defined in claim 2 wherein the flow restrictor is in fluid communication with the second and third cavities to allow cooling air to escape from the second cavity while maintaining the first cavity, second cavity and a respective hollow struts pressurized with the cooling air.

4. The gas turbine engine as defined in claim 3 wherein the cooling air discharge device at the upstream side of the MTF defines a flow restricting/sealing arrangement for splitting the cooling air escaping from the flow restrictor, into a first air flow to be discharged from the cooling air system to cool the first turbine rotor assembly and a second air flow to be directed into the third cavity.

5. The gas turbine engine as defined in claim 4 wherein the flow restricting/sealing arrangement is formed in cooperation with the first turbine rotor assembly and the MTF, to allow the first air flow discharged from the cooling air system to pressurize a blade rim seal and to cool a blade back cavity of the first turbine rotor assembly.

6. The gas turbine engine as defined in claim 4 wherein the flow restricting/sealing arrangement comprises at least one annular, axial surface defined in each of the annular inner duct wall and the annular inner case, in cooperation with a seal component defined on an annular rear plate mounted on a rotor disc of the first turbine rotor assembly.

7. The gas turbine engine as defined in claim 4 wherein the second air flow directed from the flow restricting/sealing arrangement is mixed with a second inlet cooling air flow introduced from the second inlet, to form a mixed cooling air flow.

8. The gas turbine engine as defined in claim 7 wherein the cooling air discharge device at the downstream side of the MTF is configured to discharge the mixed cooling air flow from the third cavity to supply cooling air for the second turbine rotor assembly.

9. The gas turbine engine as defined in claim 2 wherein the cooling air passage in the annular beating housing comprises a radial section to direct a second inlet cooling air flow introduced from the second inlet, to pass between a rear seal of a first bearing of the first turbine rotor assembly and a front seal of a second bearing of the second turbine rotor assembly, thereby pressurizing the respective seals.

10. The gas turbine engine as defined in claim 9 wherein the cooling air passage in the annular bearing housing comprises a forward section and a rearward section to split the cooling air flow having passed through the radial section, into a forward cooling air flow for pressurizing a front seal of the first bearing of the first turbine rotor assembly and a rearward cooling air flow for pressurizing a rear seal of the second bearing of the second turbine rotor assembly.

11. The gas turbine engine as defined in claim 2 wherein the annular inner case comprises an arch structure defining a chamber for receiving a portion of a first inlet cooling air flow which has passed through the first cavity, the plurality of hollow struts and the second cavity and a portion of a second inlet cooling air flow which has passed through the cooling air passage in the annular bearing housing, the portions of first and second inlet cooling air flows being mixed in the chamber and discharged through the third cavity for supplying cooling air to the second turbine rotor assembly.

12. The gas turbine engine as defined in claim 1 wherein the cooling air discharge device at the upstream side of the MTF is located at a front axial end of the annular outer duct wall for supplying cooling air to a turbine shroud of the first turbine rotor assembly.

13. The gas turbine engine as defined in claim 1 wherein the cooling air discharge device at the upstream side of the MTF is located at a front axial end of the annular inner duct wall for supplying cooling air to pressurize a blade rim seal and to cool a back cavity of the first turbine rotor assembly.

14. The gas turbine engine as defined in claim 1 wherein the cooling air discharge device at the downstream side of the MTF is located at a rear axial end of the annular outer duct wall for supplying cooling air to a turbine shroud of the second turbine rotor assembly.

15. The gas turbine engine as defined in claim 1 wherein the cooling air discharge device at the downstream side of the MTF is located at a rear axial end of the annular inner duct wall for supplying cooling air to a rotor of the second turbine rotor assembly.

16. A gas turbine engine comprising:
   a first turbine rotor assembly and a second turbine rotor assembly axially spaced apart from each other;
   a mid turbine frame (MTF) disposed axially between the first and second turbine rotor assemblies;

a cooling air system including a first inlet defined in the MTF and a second inlet defined in a rotating shaft of the gas turbine engine for receiving pressurized cooling air from separate passages, the cooling air system having a first cavity between an outer case and an outer duct wall of an inter-turbine duct (ITD) disposed inside the outer case, a second cavity between an inner duct wall of the ITD and an inner case, a third cavity between the inner case and a bearing housing mounted to the inner case, a cooling air passage in the bearing housing, and a chamber defined by an arch structure integrated with the inner case and communicating with the first inlet through a first flow path, the first flow path extending from the first cavity through a hollow passage in the ITD to the second cavity, the chamber communicating with the second inlet through a second flow path, the second flow path extending through the cooling air passage in the bearing housing, the chamber also communicating with the third cavity, and at least one of the first, second and third cavities including a cooling air discharge device located at respective upstream and downstream sides of the MTF for discharging cooling air from the system to the respective first and second rotor assemblies.

17. The gas turbine engine as defined in claim 16 wherein the cooling air passage in the bearing housing comprises a radial section, a forward section and a rearward section, the radial section directing the second inlet cooling air flow to pass between a rear seal of a first bearing of the first turbine rotor assembly and a front seal of a second bearing of the second turbine rotor assembly, thereby pressurizing the respective seals, the forward section and the rearward section splitting the second inlet cooling air flow which has passed through the radial section, into a forward cooling air flow for pressurizing a front seal of the first bearing of the first turbine rotor assembly and a rearward cooling air flow for pressurizing a rear seal of the second bearing of the second turbine rotor assembly.

18. The gas turbine engine as defined in claim 16 wherein the cooling air discharge device at the upstream side of the MTF is located at a front axial end of the inner duct wall for supplying cooling air to pressurize a blade rim seal and to cool a back cavity of the first turbine rotor assembly.

19. The gas turbine engine as defined in claim 16 wherein the cooling air discharge device at the downstream side of the MTF is located at a rear axial end of the outer duct wall for supplying cooling air to a turbine shroud of the second turbine rotor assembly.

20. The gas turbine engine as defined in claim 16 wherein the mixed portions of the first inlet cooling air flow and the second inlet cooling air flow are discharged from the third cavity for supplying cooling air to a rotor of the second turbine rotor assembly.

* * * * *